United States Patent
Bartolome

(10) Patent No.: US 9,560,320 B2
(45) Date of Patent: *Jan. 31, 2017

(54) REVERSE 911 USING TV

(71) Applicants: Sony Corporation, Tokyo (JP); Sony Electronics Inc., Park Ridge, NJ (US)

(72) Inventor: Angela Bartolome, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/457,749

(22) Filed: Aug. 12, 2014

(65) Prior Publication Data

US 2014/0373045 A1 Dec. 18, 2014

Related U.S. Application Data

(63) Continuation of application No. 12/039,988, filed on Feb. 29, 2008, now Pat. No. 8,959,545.

(51) Int. Cl.
| | |
|---|---|
| H04N 7/173 | (2011.01) |
| G08B 27/00 | (2006.01) |
| H04N 21/475 | (2011.01) |
| H04N 21/488 | (2011.01) |
| H04N 21/81 | (2011.01) |
| H04N 21/258 | (2011.01) |
| H04N 21/41 | (2011.01) |
| H04N 21/443 | (2011.01) |
| H04N 21/61 | (2011.01) |
| H04N 21/478 | (2011.01) |

(52) U.S. Cl.
CPC ........ *H04N 7/17318* (2013.01); *G08B 27/005* (2013.01); *G08B 27/008* (2013.01); *H04N 21/25883* (2013.01); *H04N 21/4131* (2013.01); *H04N 21/4432* (2013.01); *H04N 21/4758* (2013.01); *H04N 21/4882* (2013.01); *H04N 21/6125* (2013.01); *H04N 21/814* (2013.01); *H04N 21/8106* (2013.01); *H04N 21/478* (2013.01)

(58) Field of Classification Search
None
See application file for complete search history.

(56) References Cited

U.S. PATENT DOCUMENTS

| | | |
|---|---|---|
| 5,574,999 A | 11/1996 | Gropper |
| 6,543,051 B1 | 4/2003 | Manson et al. |
| 7,114,169 B1* | 9/2006 | Kahn .............................. 725/33 |
| 2005/0273809 A1 | 12/2005 | Kendall et al. |
| 2006/0015916 A1 | 1/2006 | Yun |
| 2006/0059512 A1* | 3/2006 | Pugel .............................. 725/33 |
| 2007/0004377 A1 | 1/2007 | Medford et al. |
| 2007/0136743 A1* | 6/2007 | Hasek et al. .................... 725/33 |
| 2007/0214049 A1* | 9/2007 | Postrel ............................ 705/14 |

OTHER PUBLICATIONS

Lucent Technologies, "AnyMedia® Access Platform for Service Providers", http://solunetcom/wp-upload/090094038008fb1White_paper.pdf, pp. 1-27.

* cited by examiner

*Primary Examiner* — John Schnurr
*Assistant Examiner* — Christine Kurien
(74) *Attorney, Agent, or Firm* — John L. Rogitz

(57) ABSTRACT

A reverse 911 can be sent to a TV communicating with the Internet. The TV is automatically turned on if it is off, and a viewer can acknowledge the reverse 911 using a TV remote control.

13 Claims, 1 Drawing Sheet

REVERSE 911 USING TV

I. FIELD OF THE INVENTION

The present invention relates generally to sending a reverse emergency signal through a TV.

II. BACKGROUND OF THE INVENTION

Currently the Emergency Alert System (EAS) makes use of broadcasters, cable television systems, wireless cable systems, satellite and radio service providers as the means to provide communications of emergency information. As understood herein, the Internet may also be used to disseminate emergency alerts.

The present invention recognizes that as more TVs become Internet-enabled, reverse 911s can be broadcast to the IP addresses of the TVs. As understood herein, however, an intended recipient's TV might be turned off when a reverse 911 is sent. As also understood herein, without an ability to acknowledge a reverse 911, emergency service providers have no way of knowing who has received the alert and who has not, requiring, for instance, police or firefighters to expend time checking on residences that already are aware of the emergency condition and have taken action accordingly.

SUMMARY OF THE INVENTION

A method includes receiving a reverse 911 message at a TV and if a display associated with the TV is not energized when the reverse 911 message is received, automatically energizing the display. The method also includes using the display to prompt a viewer to input an acknowledgement of the message using a TV input device.

The TV can be associated with an Internet Protocol (IP) address in which case the message may be addressed to the IP address of the TV. The display can be a visual display and/or it can be an audio speaker the volume of which can be established in response to the message. In some implementations a demographic-specific message and/or location-specific message can be presented in the display.

In another aspect, a TV system has a TV display and a processor that receives an emergency alert from the Internet. The display is automatically energized in response to the alert if not already energized so as to display a message associated with the alert.

In still another aspect, a TV system has a TV display and a processor that receives an emergency alert from the Internet. The display is caused to present a prompt to acknowledge the alert.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
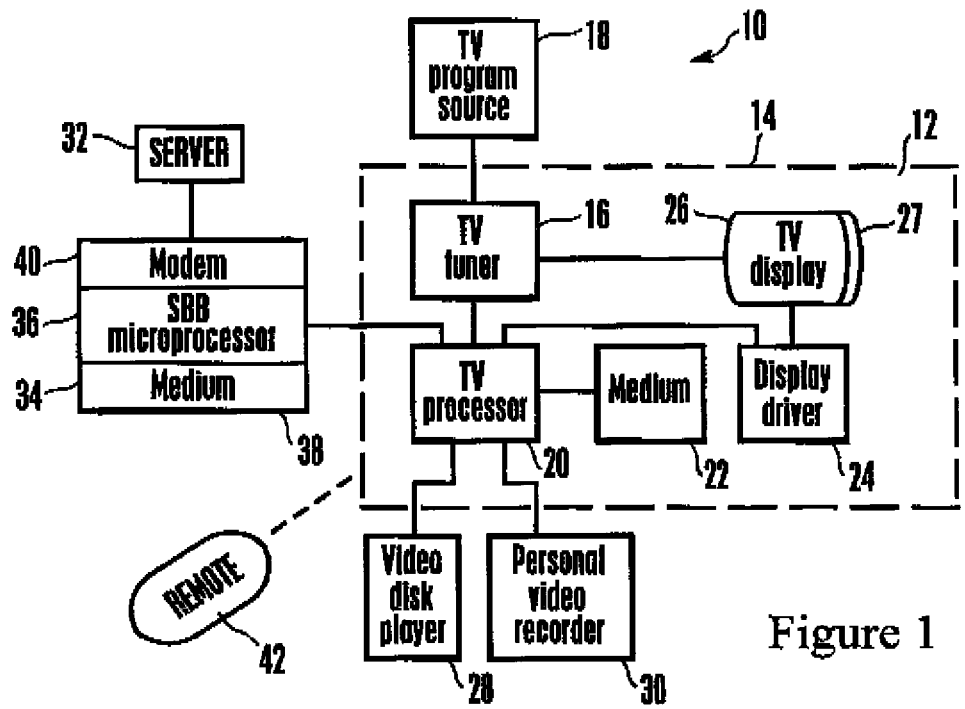
FIG. 1 is a non-limiting block diagram of a system in accordance with present principles.

Referring initially to FIG. 1, a system is shown, generally designated 10, which includes a television 12 defining a TV chassis 14 and receiving, through a TV tuner 16 from a cable or satellite or other source or sources 18 audio video TV programming. The tuner 16 may be contained in the set box described below.

The TV 12 typically includes a TV processor 20 accessing a tangible computer readable medium 22. The tangible computer readable medium 22 may be established by, without limitation, solid state storage, optical or hard disk storage, etc. The medium 22 may store software executable by the TV processor 20 to, e.g., control a display driver 24 that drives a TV visual display 26 in accordance with one or more settings such as brightness, contrast, and the like that may be stored in, e.g., the medium 22. The display 26 may be a flat panel matrix display, cathode ray tube, or other appropriate video display, and typically is associated with one or more audio speakers 27. The medium 22 may also contain additional code including backend software executable by the TV processor 20 for various non-limiting tasks. One or more of the processors described herein may execute the logic below, which may be stored as computer code on one or more the computer readable media described herein.

In the non-limiting embodiment shown in FIG. 1 the TV 12 may receive programming from external components such as but not limited to a video disk player 28 such as a Blu-Ray or DVD player and a personal video recorder (PVR) 30 that can contain audio-video streams on a hard disk drive.

Additionally, the TV 12 can communicate via a network such as the Internet with an emergency alert server 32. While only a single server 32 is shown for clarity, redundant servers or server farms can be provided in different geographic locations and used to provide location-specific emergency information to the intended area. The below-described emergency message content may reside on the server 32, which typically is managed by state and local authorities.

To this end, the TV 12 preferably is Internet-enabled, although it is to be understood that the server 32 may be combined with the TV program source 18 when the source 18 is a remote entity accessible over a wide area network, in which case no modem need be provided, with the TV sending signals in accordance with the logic below through a reverse link to the source 18/server 32.

In the non-limiting embodiment shown, the server 32 is separate from the source 18 and the TV 12 communicates with the server 32 through a set-back box (SBB) 34. In some implementations a set-top box (STB) may be used, and the SBB/STB may itself include the tuner 16 or otherwise communicate with the source 18.

In any case, the SBB 34 shown in FIG. 1 may include a SBB processor 36 and SBB computer readable medium 38. The SBB 34 may also include a network interface such as but not limited to a modem 40 to communicate with the server 32 over the Internet. In other implementations the modem 40 may be incorporated into the TV chassis 14.

It may now be appreciated that the TV 12 can be assigned an Internet Protocol (IP) address which, among other things, can be correlated to the geographic region of the TV. Furthermore, the demographics of viewers of the TV can be received by means of, e.g., a wireless TV remote control device 42 in response to a prompt from, e.g., the server 32, so that the ages and other demographics of people in the household of the TV 12 can be known to the server 32.

Figure 2:
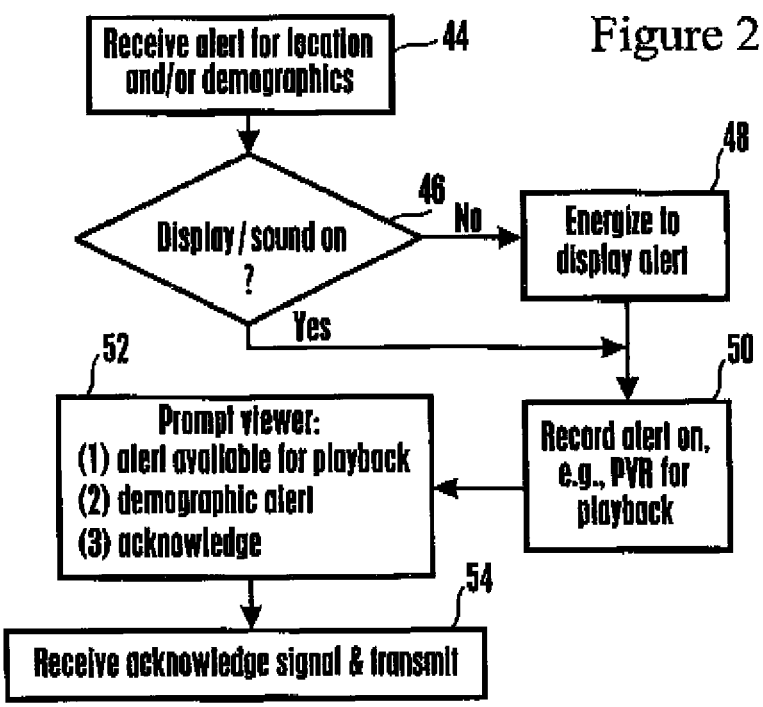
FIG. 2 is a flow chart of logic that may be employed by the system of FIG. 1.

Referring now to FIG. 2, at block 44 an emergency alert, which is sometimes referred to as a "reverse 911", is received at the TV 12. The alert may be for the geographic location associated with the IP address of the TV 12. For example, an alert for a fire evacuation may be sent to all IP addresses indicated as being located in a particular area of a city.

The alert may also be tailored to the demographics of the viewers or persons in the dwelling in which the TV 12 is located. Demographics such as age, sex, etc. can be entered using the remote control 42 in response to an initial emergency set-up screen that is displayed at initial power-on. The demographic data can then be uploaded to the server 32 and correlated with the IP address of the TV. Using this data, for example, an alert subsequently might be sent only to IP addresses associated with elderly people, or to all IP addresses in a given location associated with children under six, and so on.

Moving to decision diamond 46, it is determined whether the display 26 and/or speaker 27 are energized when the alert is received. Typically a portion of a TV (e.g., at least the processor 20) remains energized even after a viewer has turned the TV off to be able to receive a subsequent "on" signal from, e.g., the remote control 42. If the display 26 and/or speaker 27 are not energized, one or both are energized at block 48 to display the alert, which may entail presenting a visual message on screen as well as activating the speaker 27 to present an aural warning or message. To this end, the volume of the speaker 27 may be automatically established to be a predetermined volume, e.g., a loud volume. The volume may be incrementally increased until an acknowledgement is received as described below.

If desired, at block 50 the alert may be recorded on, e.g., the PVR 30 for review, particularly in the event that parts of the alert were received prior to energizing the display. At block 52, the TV may present an onscreen prompt to the viewer that the alert is available for such playback.

Additional prompts that may be displayed include the above-described demographic message as well as a prompt to acknowledge the alert by, e.g., touching a particular key or keys on the remote control 42 or on the TV chassis. Such an acknowledgement may be received at block 54 and uploaded to the server 32 so that emergency personnel will be aware of which dwellings have viewed the alert and which have not, and take action (such as in-person visits to non-acknowledging dwellings) accordingly.

Viewers may be given the opportunity at, e.g., initial power-on to configure some of the actions above. For instance, the volume the speaker 27 will be set to upon receipt of a reverse 911 can be established by the viewer. These variations on how to alert can be configured using a user interface such as "cross-media bar" menu settings. Pending configuration, a special channel automatically can be tuned to view the alert video and/or messages.

In some implementations, tuning away from the special channel may be prevented until an acknowledgement is received. Once the alert is acknowledged as described above, the capability to move back and forth from the special channel to regular broadcast programming may be returned.

In addition to the above, a time of day feature (or a time-out feature) can be provided that turns on all house lights or that activates a house alarm in, e.g., the night time hours until such time as an acknowledgement is received.

In non-limiting implementations a technology such as universal plug and play ("UPnP") can be used to take advantage of the fact that most homes have internal IP addresses for the devices in the home. It can be used to allow the public facing entity (e.g., the modem) to recognize a private facing entity (e.g., the TV).

For the above-described wake up feature, a technology such as wake on LAN (WoL) can be used to trigger the automatic power on. WoL works with all network traffic including Internet traffic where a "magic" packet can be broadcast and the listening device (the TV or SBB in this case) can receive the packet, check it and thus, power up the television.

If desired, authentication and the verification for the above-described alert acknowledgement can be achieved through the use of encryption and through the use of a digital signature and a certificate.

While the particular REVERSE 911 USING TV is herein shown and described in detail, it is to be understood that the subject matter which is encompassed by the present invention is limited only by the claims.

What is claimed is:
1. A system, comprising:
   at least one non-transitory computer memory comprising instructions executable by at least one processor for:
   receiving an emergency alert;
   presenting the alert on a display;
   preventing changing from a first content source on which the alert is received to a second content source until an acknowledgement of the alert is received; and
   responsive to a determination of an acknowledgement being received, reenabling capability to change from the first content source to the second content source.
2. The system of claim 1, wherein the instructions are executable to automatically energize the display automatically in response to the alert if not already energized so as to display a message associated with the alert.
3. The system of claim 1, wherein the alert is received and/or generated based at least in part on at least one of age, sex, of a person associated with the system.
4. The system of claim 1 wherein the alert is generated based on age of a person associated with the system.
5. The system of claim 1, wherein the alert is generated based on a sex of a person associated with the system.
6. The system of claim 1, wherein the instructions are executable for;
   responsive to the alert, energizing at least one lamp in a dwelling containing the display at least until an acknowledgement of the alert is received, the lamp not being part of the display.
7. A system comprising:
   at least one non-transitory computer memory comprising instructions executable by at least one processor for;
   receiving an emergency alert;
   presenting on at least one display a prompt to acknowledge the alert;
   disabling tuning and/or navigating away from a first content source to a second content source until an acknowledgement of the alert is received; and
   responsive to a determination of an acknowledgement being received, reenabling capability to tune and/or navigate away from the first content source to the second content source.
8. The system of claim 7, wherein the instructions are executable to automatically energize the display in response to the alert if not already energized so as to display a message associated with the alert.
9. The system of claim 7, wherein the system is associated with an Internet Protocol (IP) address and the alert is addressed to the IP address of the system.
10. The system of claim 7, wherein the display is a visual display.

11. The system of claim 7, wherein the display is an audio speaker, the volume of which is established in response to the alert.

12. The system of claim 7, wherein the alert includes, a message that is demographic-specific.

13. The system of claim 7, wherein the alert includes a message that is location-specific.

\* \* \* \* \*